(12) United States Patent
Murase et al.

(10) Patent No.: US 9,348,465 B2
(45) Date of Patent: May 24, 2016

(54) INPUT METHOD, INPUT DEVICE, AND STORAGE MEDIUM

(71) Applicant: FUJITSU LIMITED, Kawasaki-shi, Kanagawa (JP)

(72) Inventors: Taichi Murase, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 14/086,535

(22) Filed: Nov. 21, 2013

(65) Prior Publication Data

US 2014/0204018 A1  Jul. 24, 2014

(30) Foreign Application Priority Data

Jan. 23, 2013 (JP) .................. 2013-009769

(51) Int. Cl.
*G06F 3/042* (2006.01)

(52) U.S. Cl.
CPC ............ *G06F 3/0425* (2013.01); *G06F 3/0426* (2013.01)

(58) Field of Classification Search
CPC combination set(s) only.
See application file for complete search history.

(56) References Cited

U.S. PATENT DOCUMENTS

| | | | |
|---|---|---|---|
| 2009/0167702 A1* | 7/2009 | Nurmi | G06F 3/0346 345/173 |
| 2012/0001845 A1* | 1/2012 | Lee | G06F 1/1673 345/156 |
| 2013/0070232 A1* | 3/2013 | Izukawa | G06F 3/0304 356/51 |
| 2013/0307949 A1* | 11/2013 | Zhang | G06F 3/042 348/61 |

FOREIGN PATENT DOCUMENTS

| | | |
|---|---|---|
| JP | 8-95737 | 4/1996 |
| JP | 11-95895 | 4/1999 |

* cited by examiner

*Primary Examiner* — Jason Olson
*Assistant Examiner* — Krishna Neupane
(74) *Attorney, Agent, or Firm* — Staas & Halsey LLP

(57) ABSTRACT

An input method that is executed by a computer includes obtaining a first image of an object using an imaging device, detecting a first feature point of the object based on a shape of the object in the first image, calculating a first angle of the object with respect to a plane on which a pressing operation is performed based on the first feature point and information on a first area of the object in the first image, and selecting a first input item from a plurality of input items based on the first angle.

14 Claims, 11 Drawing Sheets

INPUT METHOD, INPUT DEVICE, AND STORAGE MEDIUM

CROSS-REFERENCE TO RELATED APPLICATION

This application is based upon and claims the benefit of priority from the prior Japanese Patent Application No. 2013-009769 filed on Jan. 23, 2013, the entire contents of which are incorporated herein by reference.

FIELD

The embodiments disclosed herein are related to a technique by which an input to an information processing device is controlled.

BACKGROUND

In recent years, the market for a device in which a keyboard and a mouse are not used, such as a smartphone and a tablet type device that includes a slate personal computer (PC) and an iPad (registered trademark), has been rapidly expanding. For example, such an electronic device displays a menu in response to a pressing operation by a user on a touch panel, and then the user selects a menu item from the menu by a following pressing operation with a finger. Upon being pressed in the following pressing operation, the electronic device identifies the selected menu item on the basis of a touch position at which the following pressing operation is performed for the touch panel display.

In addition, there is also an input scheme in which an input pen is used instead of a keyboard and a mouse. For example, in Japanese Laid-open Patent Publication No. 8-95737, a digitizer is disclosed that allows a single menu item to be selected from a plurality of menu items. The digitizer includes an input pen and a coordinate detection unit in which a plurality of loop coils are arrayed. The input pen of the digitizer is used to indicate a position on the basis of electromagnetic coupling to the coordinate detection unit.

The digitizer detects the position touched by the input pen and a tilt direction of the input pen on the basis of detected voltage. When a user tilts the input pen to a certain angle, the tilt direction is determined by detecting sub-peak voltage Vb that appears as a side lobe indicating the tilted direction while a main-peak voltage Va indicating the touched position.

The digitizer selects a main menu item from a plurality of main menu items on the basis of the tilt direction of the input pen. After that, the digitizer selects a sub-menu item from a plurality of sub-menu items that are related to the selected main menu item, on the basis of pressure applied by the input pen.

SUMMARY

According to an aspect of an embodiment an input method that is executed by a computer, the input method includes: obtaining a first image of an object using an imaging device, detecting a first feature point of the object based on a shape of the object in the first image, calculating a first angle of the object with respect to a plane on which a pressing operation is performed based on the first feature point and information on a first area of the object in the first image, and selecting a first input item from a plurality of input items based on the first angle.

The object and advantages of the embodiments will be realized and attained by the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

In an electronic device that uses a touch panel, it is desirable that a user accurately touches a position that corresponds to a desired menu item to select it from a menu. It is desirable that the above-described digitizer is operated by a special pen or a finger on which a special sensor is mounted.

Therefore, an object of a technique disclosed in the embodiments is to achieve high operability in menu selection compared with that of the related arts.

The embodiments are described in detail below. The embodiments described below may be combined as appropriate within a range in which contents of processing are not contradicted. The embodiments are described below with reference to accompanying drawings.

Figure 1:
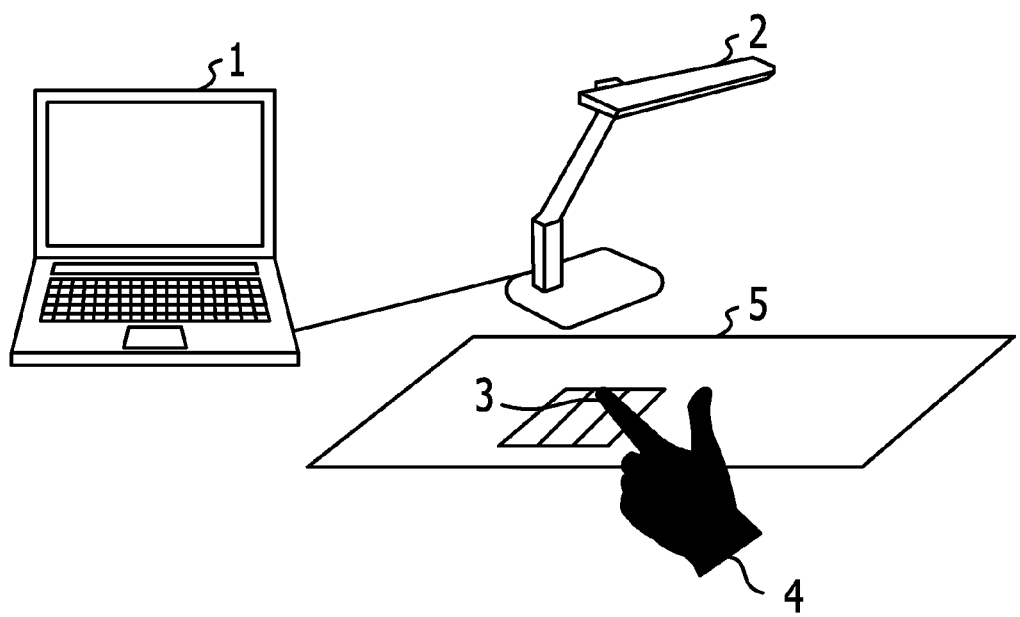
FIG. 1 is a diagram illustrating an example of a system configuration including an information processing device.

First, an input method according to an embodiment is described. FIG. 1 is a diagram illustrating an example of a system configuration including an information processing device 1. The information processing device 1 is a computer that includes an input device according to the embodiment.

The information processing device 1 is the computer and corresponds to, for example, a smartphone, a slate PC, a tablet type device, or the like. The information processing device 1 might not include a keyboard and a mouse. In the embodiment, the information processing device 1 receives an input from an input device that is described later and executes processing in response to the input. The input device performs a certain input operation on the information processing device 1, depending on an angle of a finger 3 of a hand 4 pointing at a certain area in an operation area 5.

Here, in FIG. 1, an example in which a projector 2 is connected to the information processing device 1 is illustrated. The projector 2 includes a function to project an image toward the operation area 5. The projected image is controlled by the input device that is included in the information processing device 1. The projector 2 further includes a camera. In the embodiment, the projector 2 includes two cameras. Each of the two cameras captures a projected image on the operation area 5 and the hand 4 and finger 3 of the user, at a certain frame interval.

The cameras that are included in the projector 2 capture a field that includes the operation area 5. The input device in the information processing device 1 obtains an image from the projector 2. The input device extracts an area of the hand 4 that is an object, from the image that is captured by the cameras.

In the embodiment, the user who desires menu selection touches the operation area 5 with the finger 3 and tilts the finger 3 around a contact point as a fulcrum. An operation in which the user touches a plane (for example, the operation area 5 in FIG. 1) with the finger 3 is referred to as a pressing operation.

In addition, the input device calculates an angle of the finger 3 on the basis of the area of the hand 4, which is extracted from the image. The input device selects one of a plurality of input candidates on the basis of the angle of the finger 3. The input device forwards data of the selected input contents to the information processing device 1.

The information processing device 1 executes the corresponding processing on the basis of the input from input device. The projector 2 projects a plurality of menu items to the operation area 5. When a menu item is selected, the projector 2 displays the selected menu item.

The camera may be installed at another position instead of the position described above referring to FIG. 1. Note that, the information processing device 1 may include two cameras, and, a plurality of menu items and a selected menu item may be displayed on a display of the information processing device 1.

Figure 2:
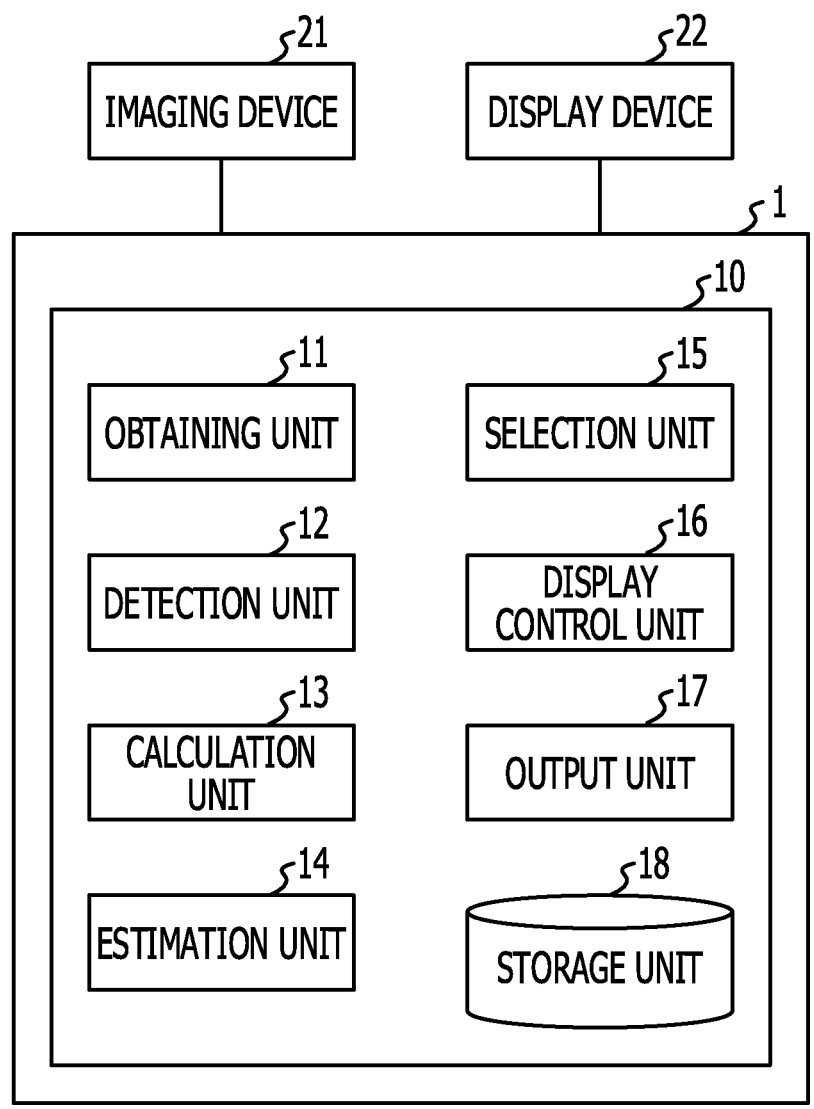
FIG. 2 is a functional block diagram of an input device.

FIG. 2 is a functional block diagram of an input device 10. As described above, the input device 10 may be included in the information processing device 1. In addition, the input device 10 is allowed to communicate with one or more imaging devices 21 and a display device 22. In the embodiment, there are the two imaging devices 21.

The imaging devices 21 are, for example, cameras that are included in the projector 2 in FIG. 1. The display device 22 is, for example, the projector 2 in FIG. 1. The input device 10 includes an obtaining unit 11, a detection unit 12, a calculation unit 13, an estimation unit 14, a selection unit 15, a display control unit 16, an output unit 17, and a storage unit 18. The obtaining unit 11 obtains images from the imaging devices 21.

The obtaining unit 11 sequentially obtains images that are captured by the imaging devices 21 at the certain frame interval. The obtaining unit 11 obtains the images from each of the two imaging devices 21. Here, it is desirable that the two imaging devices 21 are synchronized in their imaging operation.

The detection unit 12 detects a distal portion, which represents a feature point of the object, on the basis of the shape of the object area in the obtained image. Specifically, when the object is the hand 4, the detection unit 12 extracts a shape of the hand area from the image by detecting a color area representing the hand on the basis of color information stored in each pixel of the image and conditional expressions regarding the color information for extracting the shape.

For example, the detection unit 12 uses the following formula 1 and formula 2 as the conditional expressions that are related to colors. The formula 1 and formula 2 indicate conditions that are related to a value of hue (H) and a value of saturation (S), respectively, when pixel values of the image are represented by a HSV color system.

$$0.11 < H < 0.22 \quad (1)$$

$$0.2 < S < 0.5 \quad (2)$$

The detection unit 12 generates a binary image by setting "1 (black)" to a pixel that satisfies the conditional expressions on the skin color and sets "0 (white)" to a pixel that does not satisfy the conditional expressions. An area that is represented by black in the binary image is a skin color area, that is, an area of the hand 4 that is the object. When the color information is represented by a color system other than the HSV color system, the detection unit 12 converts the color information into that of the HSV color system.

Figure 3A:
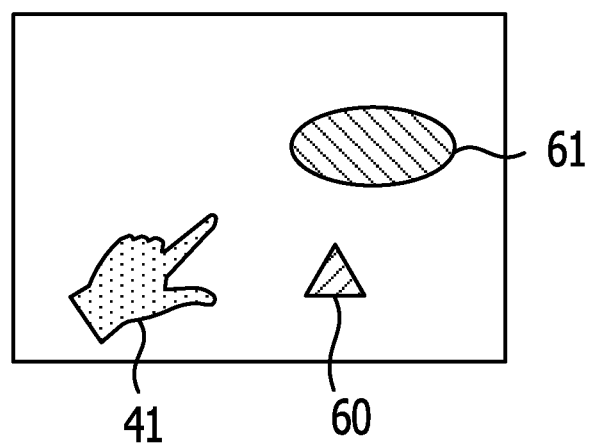
FIGS. 3A and 3B are diagrams illustrating processing of extracting an area of an object.
Figure 3B:
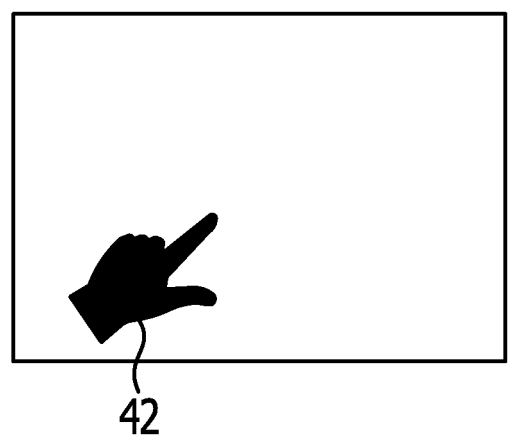

FIGS. 3A and 3B are diagrams illustrating processing of extracting an area of the object. FIG. 3A is a diagram illustrating an image that is obtained by the obtaining unit 11. FIG. 3A illustrates one of the images that are obtained in the two imaging devices 21. Here, the detection unit 12 extracts an area of the object in each of the images by executing similar processing for the images. For example, it is assumed that, in the image illustrated in FIG. 3A, images of a hand 41, an object 60, an object 61 and a background are captured. Here, it is assumed that the hand 41, the object 60, and the object 61 have different colors in the actual images.

FIG. 3B is a binary image that corresponds to the image in FIG. 3A. In the binary image, only a hand area 42 that corresponds to the hand 41 is illustrated. That is, when the detection unit 12 executes processing of detecting the hand area, for the image of FIG. 3A, an area that is constituted by pixels that satisfy the conditional expressions regarding colors in the image of FIG. 3A is represented by the binary image as the hand area 42.

In addition, the detection unit 12 detects, for example, a pixel that constitutes the distal portion of the finger as a feature point on the basis of the shape of the area of the object. For example, the detection unit 12 detects the feature point using the shape of the hand area 42 in FIG. 3B. Furthermore, the detection unit 12 obtains coordinates (x, y) of the feature point in each binary image.

Here, in the detection of the feature point, pattern matching between a shape model of the fingertip and the extracted shape of the hand area 42 is used. Note that, a method may be utilized in which the shape of the hand area 42 is recognized, a finger area is extracted, and the tilt of the finger is used. For example, the technique that is disclosed in Japanese Laid-open Patent Publication No. 2003-346162 may be utilized.

Then, the calculation unit 13 calculates an angle of the object with respect to a plane on which a pressing operation is performed, on the basis of the feature point and the area of the object. For example, the calculation unit 13 calculates an angle of the finger 3 with respect to the operation area 5. First, the calculation unit 13 calculates a distance Z between the object and the imaging device 21. For example, when the two imaging devices are arranged in parallel, the distance Z is obtained using the following formula 3. In the embodiment, first, the distance Z between the fingertip and the imaging device 21 is obtained using the detected feature point.

$$Z = \frac{f \cdot T}{x1 - x2} \quad (3)$$

"f" indicates a focal length of the camera. "T" indicates a distance between the cameras. "x1" indicates a coordinate position of a feature point in an image that is captured by one of the cameras. "x2" indicates a coordinate position of a feature point in an image that is captured by the other camera.

The distance Z is a distance between the midpoint of the two cameras and the fingertip in the real space.

After that, the calculation unit 13 detects the presence or absence of a pressing operation by the user, using the value of the distance Z. For example, the calculation unit 13 determines that the pressing operation has been performed when the distance Z is equal to a distance M between the imaging device 21 and one point in the operation area 5. In addition, as indicated by the following formula 4, the presence or absence of a pressing operation may be determined while considering an offset α. That is, when the value of the distance Z is greater than a value that is obtained by adding the offset α to the distance M, the calculation unit 13 determines that the pressing operation by the user has been performed.

$$Z \geq M + \alpha \qquad (4)$$

Figure 4:
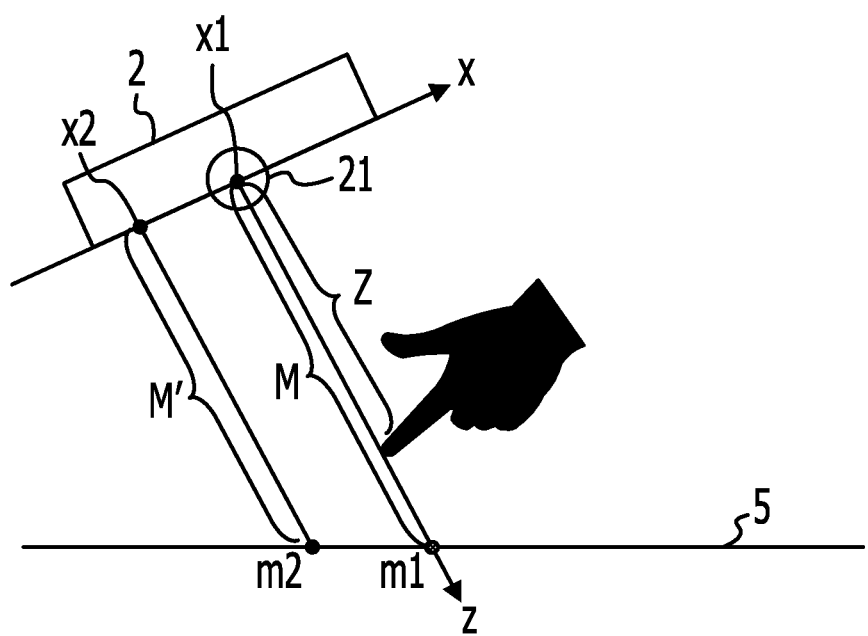
FIG. 4 is a diagram illustrating processing of extracting a pressing operation.

FIG. 4 is a diagram illustrating the processing of detecting a pressing operation. In FIG. 4, there are the two imaging devices 21 in a depth direction (y direction), and, a transverse direction in images that are captured by two imaging devices corresponds to the x direction in FIG. 4. In addition, the two imaging devices 21 are arranged so that the central optical axes of them become parallel to a z direction.

For example, the distance M is a distance from a position x1 of the imaging device 21 in the x direction to a position m1 in the z direction. The distance M is set beforehand in accordance with the height of a stand when the projector 2 is a stand type as illustrated in FIG. 1.

In the example of FIG. 4, it is indicated that the user does not perform a pressing operation. This is why the distance Z from the imaging device 21 to the fingertip is smaller than the distance M. The plurality of data of distance M that is to be used in the formula 4 may be stored for respective positions in the x direction. As illustrated in FIG. 4, when the plurality of data of distance M including a distance M', which is a distance from a position x2 to a position m2, are stored, a distance M that is to be compared with the distance Z may be appropriately selected from the plurality of data of distance M depending on the positions of the hand and finger.

When a pressing operation is detected on the basis of the formula 4, the calculation unit 13 calculates an angle of the finger on the basis of the feature point and the hand area that are detected by the detection unit 12. When the pressing operation is not detected, a signal indicating that the pressing operation is not detected is output to the selection unit 15 that is described later.

Figure 5:
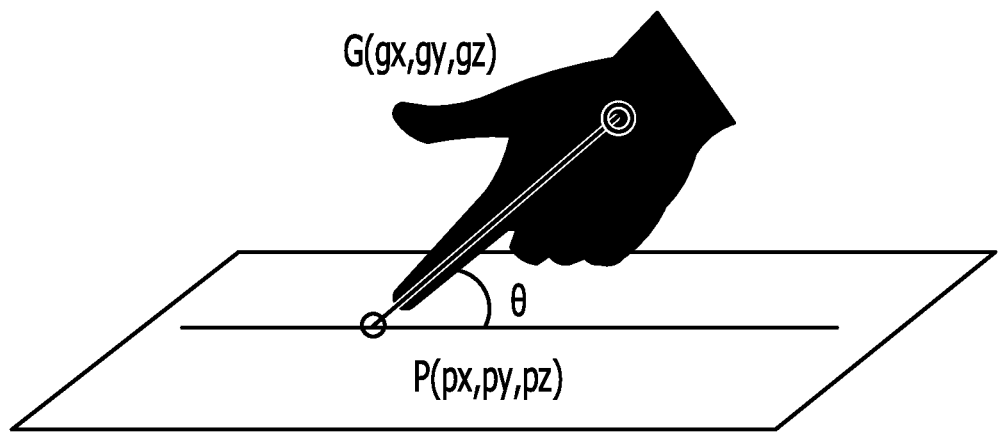
FIG. 5 is a diagram illustrating processing of calculating an angle of a finger.

FIG. 5 is a diagram illustrating processing of calculating an angle of the finger. In the embodiment, the angle is calculated using the feature point and a barycenter of the hand area, and the embodiment is not limited to such an example. For example, instead of the barycenter, a point that corresponds to the base portion of the finger may be extracted from the hand area, and the angle of the finger may be calculated from the feature point and the point that corresponds to the base portion.

The calculation unit 13 obtains data of a three dimensional position (px, py, pz) of the feature point P and a three dimensional position (gx, gy, gz) of a barycenter G. Here, coordinates (x, y) of a feature point in an image that is captured by one of the two imaging devices 21 corresponds to the three dimensional position (px, py) of the feature point P. In addition, a distance Z between the imaging device 21 and the fingertip, which is calculated by the above-described detection unit 12, corresponds to the three dimensional position pz of the feature point P.

The calculation unit 13 obtains the barycenter G of the hand area in the binary image for each of the images that are captured by the two imaging devices 21. Here, the x coordinate and y coordinate are obtained as the position of the barycenter G. The distance Z between the imaging device 21 and the barycenter G of the hand is obtained on the basis of the coordinates of two barycenters G and the formula 3.

The calculation unit 13 sets the coordinates (x, y) of the barycenter G, which corresponds to any one of the two binary images as the three dimensional position (gx, gy) of the barycenter G. The value of the distance Z is set as that of the three dimensional position gz of the barycenter G.

The calculation unit 13 calculates an angle θ of the finger by assigning the data of three dimensional position (px, py, pz) of the feature point P and the data of three dimensional position (gx, gy, gz) of the barycenter G, to the formula 5. The calculation unit 13 outputs a signal indicating the angle θ to the selection unit 15.

$$\theta = \tan^{-1}\left(\frac{gz - pz}{\sqrt{(gx - px)^2 + (gy - py)^2}}\right) \qquad (5)$$

The estimation unit 14 estimates a current angle of the finger when the detection unit 12 has not detected the feature point. For example, the estimation unit 14 estimates the current angle of the finger on the basis of the feature point in the previous image and the area of the object in the current image. For example, the estimated angle θ is calculated by assigning the three dimensional position data of the feature point P in the previous image and the three dimensional position data of the barycenter G of the object in the current image (latest image) to the formula 5. The estimation unit 14 may determine whether or not the pressing operation is being continued, and estimate the angle of the finger. The continuation determination of a pressing operation when the feature point is not detected is described later.

Here, as described above, there is a case in which the angle θ of the finger is adjusted in order to select a desired menu item after the user has performed the pressing operation. At that time, there is a case in which all or a part of the finger and the fingertip touching to the fulcrum in the pressing operation are not captured in an image depending on a relationship between the angle of the finger and the angle of the imaging device 21 with respect to the operation area 5. When the fingertip is not included in the image that is captured by the imaging device 21, the feature point is not captured by the detection unit 12.

For example, an algorithm is generally known by which a fingertip is detected when an image of a finger having an L/n or more length is captured as compared with a finger having a full length. That is, in the algorithm, when an image of the finger having an L/n or less length is captured, it is indicated that the fingertip is not detected.

Here, as an angle γ between the central optical axis of the camera and a perpendicular line with respect to the operation area 5 becomes small, when the finger is gradually tilted, an angle of a boundary in which the fingertip does not appear becomes a small value. That is, when the camera is arranged to face in a downward direction with respect to the operation area 5, a state in which the fingertip is not detected easily occurs.

In addition, as "n" becomes small, when the finger is gradually tilted, the angle of the boundary in the fingertip does not appear becomes a small value. That is, when "n" becomes small, it is indicated that detection accuracy in the algorithm by which the fingertip is detected is high (that is, a more stringent criterion is applied to recognize a finger in order to remove false detection), and a state in which the fingertip is not detected easily occurs as the detection accuracy is high. For example, the following formula 6 is satisfied between an angle β of a boundary in which the fingertip does not appear, and the angle γ and "n".

$$\beta = \beta \cos(i/n) + \gamma \qquad (6)$$

Returning to FIG. 2, the selection unit 15 selects one input candidate from a plurality of input candidates on the basis of the angle θ that is calculated by the calculation unit 13 and the angle θ that is estimated by the estimation unit 14. For example, one menu item of a plurality of menu items is selected.

Here, in the image that is obtained after the pressing operation has been detected once, the selection unit 15 provisionally selects a menu item on the basis of an angle in each of the images while a pressing operation is continued. Here, an angle that corresponds to each of the plurality of menu items is set as setting information beforehand. The setting information that is stored in the storage unit 18 is referred to by the selection unit 15.

When the pressing operation is carried out, the selection unit 15 fixes the menu item that has been provisionally selected previously. When the calculation unit 13 does not detect a pressing operation after the pressing operation has been detected or when the estimation unit 14 determines that the pressing operation is not being continued in a pressing continuation determination operation that is described later, the selection unit 15 determines that the pressing operation has been carried out and fixes the menu item.

Information on the provisionally-selected menu item is output to the display control unit 16. In addition, information on the fixed menu item is output to the output unit 17.

Figure 6:
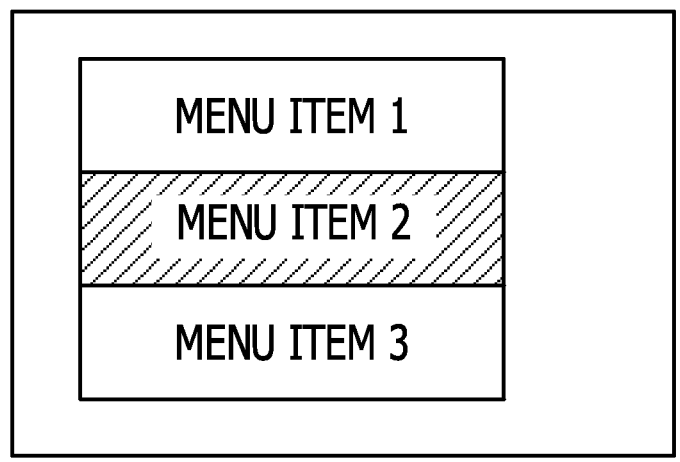
FIG. 6 is a diagram illustrating a display image that is displayed on the basis of display information.

The display control unit 16 generates display information that is used to display a menu item that is currently being selected from the other menu items in a different manner. For example, the display control unit 16 generates display information that is used to highlight the provisionally-selected menu item. FIG. 6 is a diagram of a display image displayed on the display device 22, on the basis of display information.

In the example of FIG. 6, it is indicated that a menu item 2 is being selected depending on an angle of the finger. The user may carry out the pressing operation if a desired menu item is highlighted. On the other hand, the user may adjust the angle of the finger if the desired menu item is not highlighted.

The output unit 17 outputs a signal representing the fixed input content to the information processing device 1. For example, the output unit 17 outputs a signal representing the fixed menu item to the information processing device 1.

The storage unit 18 stores setting information. The setting information includes the maximum values and the minimum values of individual angles of a finger pointing a menu item, which are used to identify a menu item selected from other menu items. For example, the storage unit 18 stores the maximum angle and the minimum angle as a range of an angle that is assigned to "menu item 1". In addition, the storage unit 18 stores information generated in the course of processing that is described later.

Figure 7A:
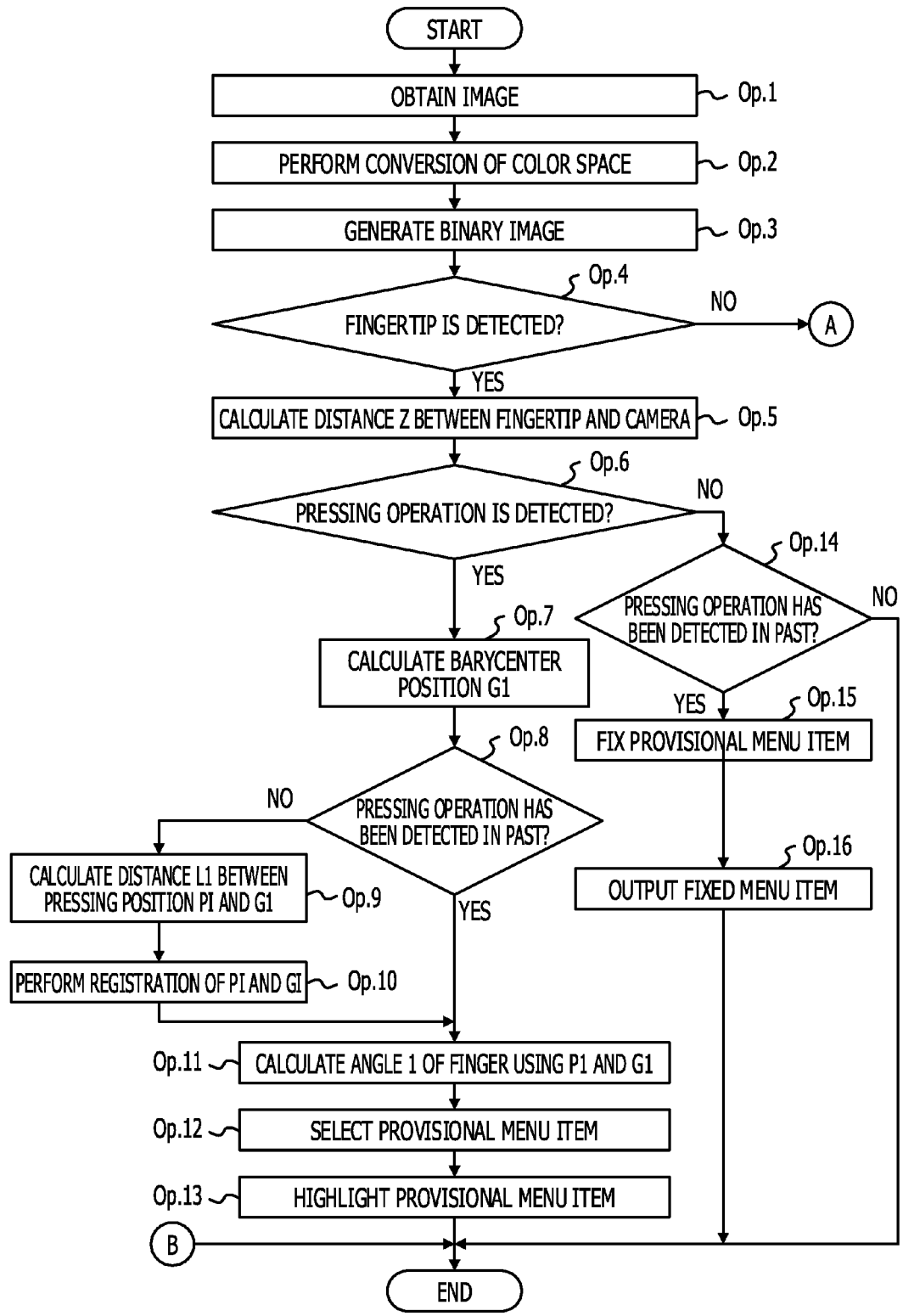
FIGS. 7A and 7B are flowcharts of input processing.
Figure 7B:
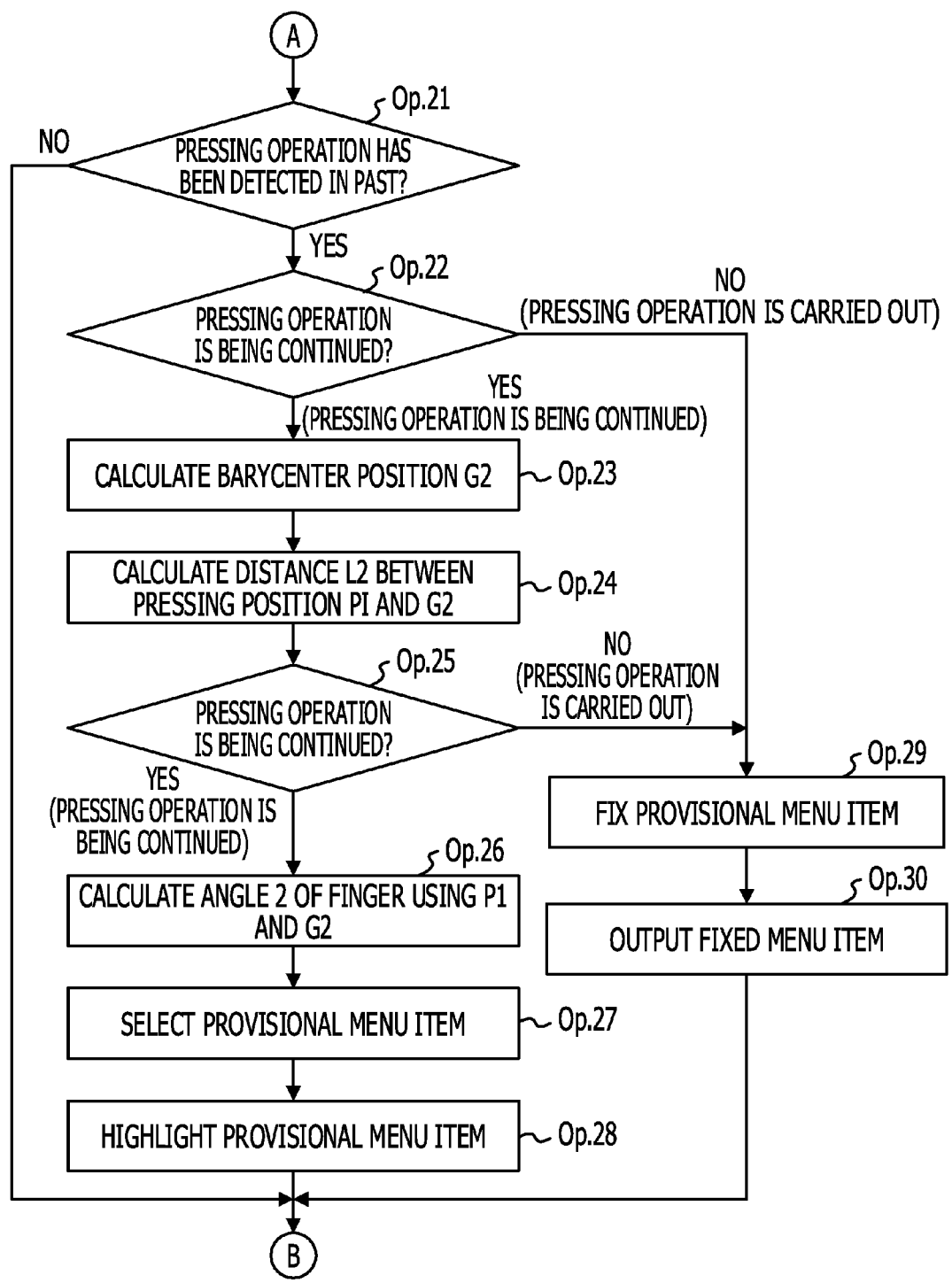

Processing by the input device 10 is described below with reference to FIGS. 7A and 7B. FIGS. 7A and 7B are flowcharts of the input processing.

First, the obtaining unit 11 obtains two images from the two imaging devices 21 (Op.1). It is desirable that the two imaging devices 21 are synchronized in their imaging operation under the control of the input device 10. After that, the detection unit 12 performs conversion of a color space for each of the images (Op.2). For example, the color information that is indicated by an RGB color system is converted into that of the HSV color system.

The detection unit 12 generates a binary image that represents the hand area, for each of the images that are obtained from the imaging devices 21, using the conditional expressions that are related to colors (Op.3). In the binary image, a pixel that satisfies the conditional expressions on the skin color is represented by "1 (black)", and a pixel that satisfies the conditional expressions on colors other the skin color is represented by "0 (white)". Therefore, hereinafter, an area to which "1 (black)" is set in the binary image is referred to an area of the hand and finger that are the objects.

Next, the detection unit 12 determines whether the fingertip has been detected (Op.4). Here, the detection unit 12 tries to detect a feature point on the basis of the shape of the hand area by the above-described method. When the feature point has been detected, the detection unit 12 determines that the fingertip has been detected.

When the detection unit 12 has detected the fingertip (Yes in Op.4), the calculation unit 13 calculates the distance Z between the fingertip and the camera on the basis of the formula 3 (Op.5). Here, in the calculation of the distance Z, the x coordinates of the feature points captured in the respective images are used.

After that, the calculation unit 13 detects the pressing operation by the user based on the distance Z (Op.6). When the formula 4 is satisfied, the calculation unit 13 determines that the pressing operation has been performed.

When the pressing operation has been detected (Yes in Op.6), the calculation unit 13 calculates the barycenter position G1 of the hand area using one of the two images that are obtained in Op.1 (Op.7). The barycenter position G1 is calculated on the basis of the following formula 7 to the formula 10.

$$m_{0,0} = \sum_x \sum_y (Fx, y) \qquad (7)$$

$$m_{1,0} = \sum_x \sum_y x(Fx, y) \qquad (8)$$

$$m_{0,1} = \sum_x \sum_y y(Fx, y) \qquad (9)$$

$$G1 = (x, y) = (m_{1,0}/m_{0,0}, m_{0,1}/m_{0,0}) \qquad (10)$$

"F (x, y)" corresponds to a function that represents the hand area. "$m_{0,0}$" represents the size of the whole hand area. "$m_{1,0}$" and "$m_{0,1}$" represent primary moment. The barycenter position G1 (x, y) of the hand area is obtained by dividing the primary moment by the size of the whole hand area.

Next, the calculation unit 13 determines whether the pressing operation has been previously detected (Op.8). Whether the pressing operation has been previously detected is determined based on whether data of a pressing position P1 and data of a distance L1 between the pressing position P1 and the barycenter position G1 are stored in the storage unit 18.

When the pressing operation has not been detected (No in Op.8), the calculation unit 13 calculates the distance L1 between the pressing position P1 and the barycenter position G1 (Op.9). The pressing position P1 is the three dimensional position (px, py, pz) of the feature point P when the pressing operation has been detected in Op.6. The barycenter position G1 is the three dimensional position (gx, gy, gz) of the barycenter G when the pressing operation has been detected in Op.6. The distance L1 is calculated on the basis of coordinates of the pressing position P1 and the barycenter position G1.

After that, the calculation unit 13 stores data of the distance L1 and the pressing position P1 when the pressing operation has been detected for the first time in the storage unit 18 (Op.10). That is, by storing data of the pressing position P1 and the distance L1 in the storage unit 18 in Op.10, it may be determined whether the pressing operation has been previously detected based on whether the data of the pressing position P1 and the distance L1 have been stored in the storage unit 18 in Op.8.

When the pressing operation has been previously detected (Yes in Op.8) or after the data of the distance L1 and the pressing position P1 have been stored (Op.10), the calculation unit 13 calculates an angle θ1 of the finger based on the data of the pressing position P1 and the barycenter position G1 (Op.11). The angle θ1 is calculated on the basis of the formula 5.

The selection unit 15 selects a menu item from the plurality of menu items as a provisional menu item on the basis of the calculated angle θ1 (Op.12). Here, the selected provisional menu item is temporarily stored in the storage unit 18. In a case in which a similar processing is executed for a newly obtained image, when a provisional menu item is newly selected, the provisional menu item that has been stored in the storage unit 18 is updated into the newly selected provisional menu item.

Next, the display control unit 16 causes the display device 22 to display the menu item that is selected as the provisional menu item from the other menu items in a different manner (Op.13). That is, the display control unit 16 generates display information and outputs the generated display information to the display device 22 through the output unit 17.

The input device 10 terminates a series of the pieces of processing, and starts the processing from Op.1 again in order to obtain a new image.

Here, in Op.6, when the pressing operation has not been detected (No in Op.6), the detection unit 12 outputs a signal indicating that the pressing operation has not been detected, to the selection unit 15. The selection unit 15 determines whether the pressing operation has been previously detected (Op.14). The selection unit 15 determines that the pressing operation has been previously detected when the data of the pressing position P1 and the distance L1 are stored in the storage unit 18.

When the pressing operation has been previously detected (Yes in Op.14), the selection unit 15 fixes a provisional menu item that has been previously detected as an input for the information processing device 1 (Op.15). After that, the output unit 17 outputs the menu item that has been fixed by the selection unit 15 to the information processing device 1 (Op.16). After the selection unit 15 has fixed the menu item, the selection unit 15 deletes the data of the pressing position P1 and the distance L1 that are stored in the storage unit 18.

That is, after a provisional menu item has been selected on the basis of a certain image, when the pressing operation is not detected in another image, the selection unit 15 determines that the pressing operation has been carried out, and determines the provisional menu item that has been selected on the basis of the certain image as an input for the information processing device 1.

When the pressing operation has not been previously detected (No in Op.14), the input device 10 terminates the processing. That is, when the pressing operation is not detected in the obtained image (No in Op.6), and when the pressing operation has not been previously detected (No in Op.14), an input operation is not performed to the information processing device 1 because the user has not performed the pressing operation.

Here, in Op.4, when the detection unit 12 has not detected a fingertip representing a feature point (No in Op.4), the estimation unit 14 determines whether the pressing operation has been previously detected (Op.21). The estimation unit 14 determines that the pressing operation has been previously detected when the data of the pressing position P1 and the distance L1 are stored in the storage unit 18.

When the pressing operation has not been previously detected (No in Op.21), the input device 10 terminates the processing. At that time, a menu item is not selected.

When the pressing operation has been previously detected (Yes in Op.21), the estimation unit 14 determines whether the pressing operation is being continued (Op.22). The continuation determination of the pressing operation, which is performed in Op.22 is referred to as a first pressing continuation determination.

Figure 8A:
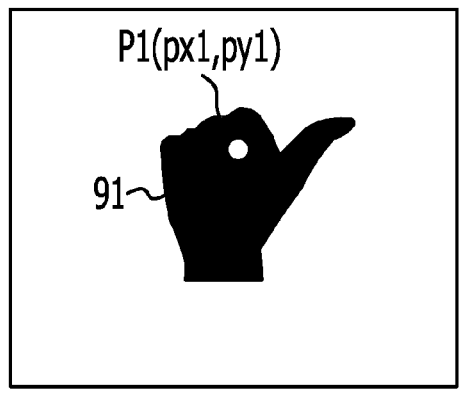
FIGS. 8A, 8B, and 8C are diagrams illustrating a first pressing continuation determination.
Figure 8B:
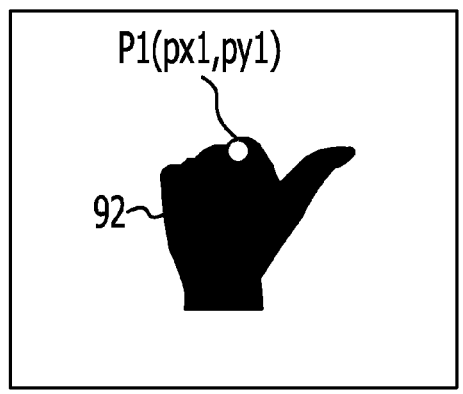
Figure 8C:
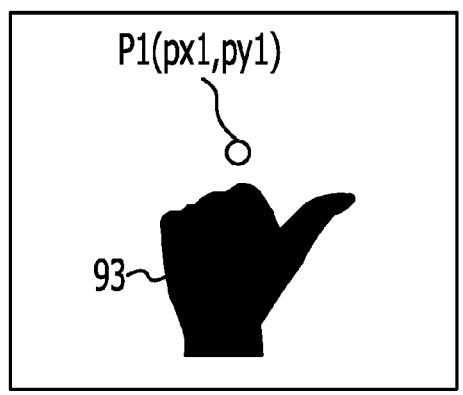

The first pressing continuation determination is described below. FIGS. 8A, 8B, and 8C are diagrams illustrating the first pressing continuation determination. Each of FIGS. 8A to 8C illustrates a hand area in one of the two binary images based on the two imaging devices 21. Here, in FIGS. 8A to 8C, it is indicated that the fingertip hides in the back of the hand and does not appear in the image.

FIGS. 8A to 8C illustrate relationships between data of a hand area 91 to a hand area 93, and data of the pressing position P1 that is stored in the storage unit 18. For example, in FIG. 8A, when the detection unit 12 executes the processing of detecting a feature point, the fingertip is not detected.

Therefore, the estimation unit 14 estimates whether the pressing operation is being continued, on the basis of information on the hand area 91 in the latest binary image and information of the pressing position P1 that is stored in the storage unit 18. Here, when the pressing position P1 is included in the hand area in the latest binary image, the estimation unit 14 determines that the pressing operation by the user is being continued.

It may be estimated that the pressing position P1 is the substantially same position in the latest binary image as long as the pressing operation is being continued because the user adjusts the angle of the finger while touching at a position (pressing position P1) at which the fingertip has previously touched when the pressing operation has been detected. That is, as long as the pressing operation is being continued, the back of the hand also exists in a position in which the fingertip is allowed to be located at the pressing position P1. Therefore, when the hand area in the latest image includes the previous pressing position P1, it may be determined that the pressing operation is being continued. For example, in the cases of FIGS. 8A and 8B, the estimation unit 14 determines that the pressing operation is being continued in the first pressing continuation determination.

In addition, when the fingertip is not detected from the latest image, and the hand area in the latest image does not include the previous pressing position P1, the estimation unit 14 may estimate that the pressing operation has been carried out. For example, in the case of FIG. 8C, the estimation unit 14 determines that the pressing operation has been carried out in the first pressing continuation determination. It does not occur that the hand area 93 is not overlapped with the pressing position P1 as long as the user adjusts the angle of the finger in a state in which the pressing position P1 is hardly moved.

When the pressing operation is being continued (Yes in Op.22), a barycenter position G2 is calculated on the basis of the hand area in the binary image of the latest image that has been captured by each of the two imaging devices (Op.23). The method of calculating the barycenter position G2 is similar to the method of calculating the barycenter position G1. Similar to the barycenter position G1, in the barycenter position G2, a barycenter position (x, y) in one of the binary images corresponds to an X coordinate and a Y coordinate of the barycenter position G2. In addition, a distance between the imaging device 21 and the barycenter in the real space corresponds to a Z coordinate of the barycenter position G2.

After that, the estimation unit 14 calculates a distance L2 between the previous pressing position P1 and the latest barycenter position G2 on the basis of the previous pressing position P1 and the latest barycenter position G2 (Op.24). In addition, here, the estimation unit 14 further determines whether the pressing operation is being continued (Op.25). The continuation determination of a pressing operation, which is performed in Op.25 is referred to as a second pressing continuation determination.

Figure 9:
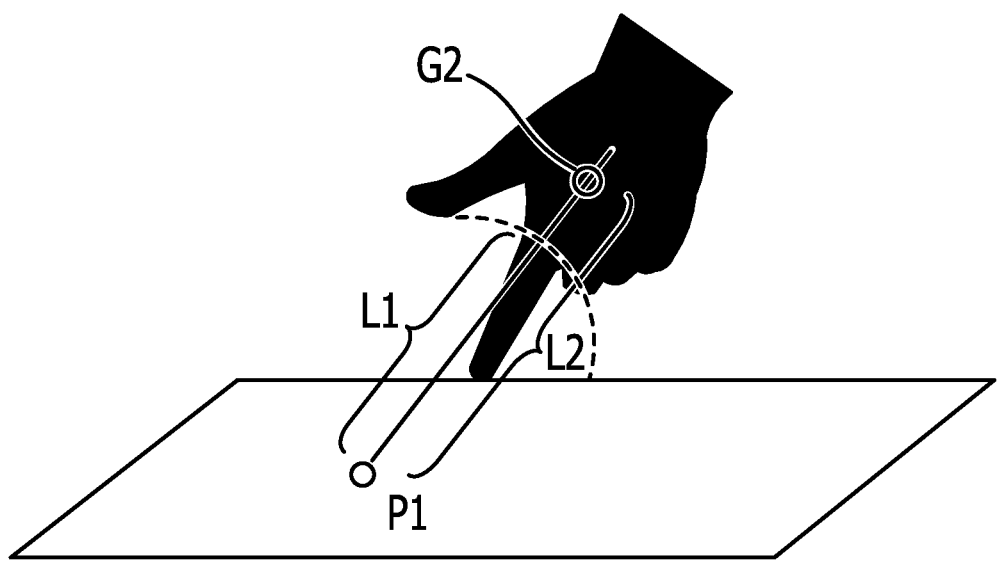
FIG. 9 is a diagram illustrating a second pressing continuation determination.

FIG. 9 is a diagram illustrating the second pressing continuation determination. When the distance L2 between the pressing position P1 and the current barycenter position G2 is greater than the distance L1 between the pressing position P1 and the previous barycenter position G1 at the time at which the pressing operation has been detected, the estimation unit 14 may estimate that the pressing operation has been carried out. As illustrated in FIG. 9, when the distance L2 is greater than the distance L1, it is indicated that the user has carried out the pressing operation.

When the pressing operation is being continued (Yes in Op.25), the estimation unit 14 calculates an angle θ2 of the finger using data of the previous pressing position P1 and the latest barycenter position G2 (Op.26). In addition, the selection unit 15 selects a menu item from the plurality of menu items as a provisional menu item on the basis of the calculated angle θ2 (Op.27). The data of the selected provisional menu item is temporarily stored in the storage unit 18.

Next, similar to Op.13, the display control unit 16 causes the display device 22 to display the menu item that has been selected as the provisional menu item from the other menu items in a different manner (Op. 28).

When it is determined that the pressing operation has been carried out in the first pressing continuation determination (No in Op.22), or when it is determined that the pressing operation has been carried out in the second pressing continuation determination (No in Op.25), the estimation unit 14 notifies the selection unit 15 of the completion of the pressing operation. In addition, the selection unit 15 refers to the storage unit 18 and fixes the menu item that is registered to the storage unit 18 as the provisional menu item, as an input data to the information processing device 1 (Op.29).

After that, the output unit 17 outputs data of the menu item that has been fixed by the selection unit 15 to the information processing device 1 (Op.30). The selection unit 15 deletes the data of the pressing position P1 and the data of the distance L1 that are stored in the storage unit 18 after fixing the menu item.

As described above, the input device 10 may input a menu item that the user desires to the information processing device 1 depending on the pressing operation and adjustment operation of angle of the finger, which follows the pressing operation. The menu selection is allowed to be performed intuitively by the user as compared to a menu selection scheme or the like in which a touch panel is used. That is, the operability is improved for the user.

Furthermore, the input device 10 may determine whether the pressing operation is being continued even when the fingertip that is to be a fulcrum of the pressing operation hides in the back of the hand. When the pressing operation is being continued, a provisional menu item that corresponds to the estimated angle of the finger may be selected on the basis of the angle of the finger. When the pressing operation is carried out, the completion is detected, and the selected menu item may be fixed.

Figure 10:
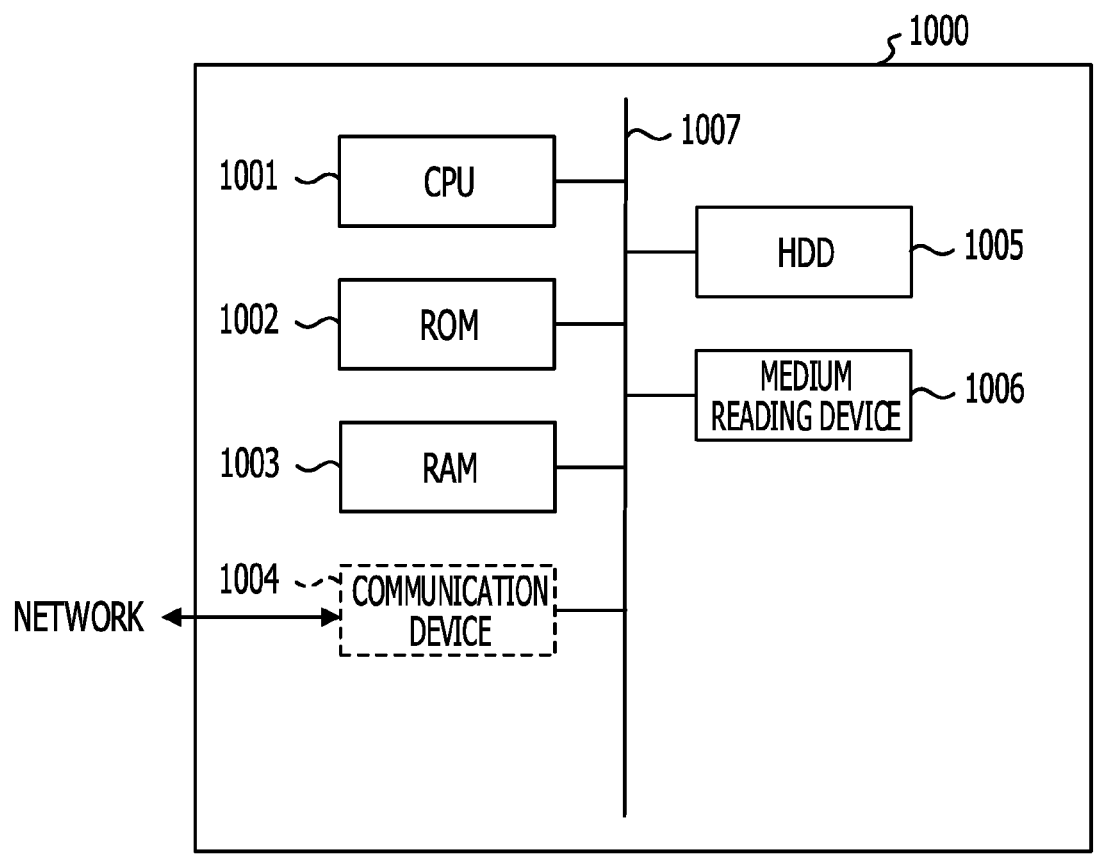
FIG. 10 is a diagram illustrating an example of a hardware configuration of the input device.

FIG. 10 is a diagram illustrating an example of a hardware configuration of the input device 10. A computer 1000 executes the above-described input processing and functions as the input device 10. The computer 1000 may function as the information processing device 1 that includes the input device 10. In addition, the projector 2 illustrated in FIG. 1 may function as the input device 10. In this case, the projector 2 corresponds to the computer 1000.

The computer 1000 includes a central processing unit (CPU) 1001, a read only memory (ROM) 1002, a random access memory (RAM) 1003, a hard disk drive (HDD) 1005, and a medium reading device 1006, and the elements are connected to each other through a bus 1007. The elements may transmit and receive data to and from each other under the control of the CPU 1001.

An input program in which the input processing is described, which is illustrated in the flowchart of each of the embodiments is recorded to a computer-readable recording medium. The computer-readable recording medium includes a magnetic recording device, an optical disk, a magneto-optical recording medium, a semiconductor memory, or the like. The magnetic recording device includes an HDD, a flexible disk (FD), a magnetic tape (MT), or the like.

The optical disk includes a digital versatile disc (DVD), a DVD-RAM, a compact disc-read only memory (CD-ROM), a compact disc recordable (CD-R)/compact disc rewritable (CD-RW), or the like. The magneto-optical recording medium includes a magneto-optical disk (MO) or the like. When such a program is distributed, for example, it is conceivable that a portable recording medium such as a DVD or a CD-ROM to which such a program is recorded is sold.

The computer 1000 that executes the input program reads the program, for example, from a recording medium to which the medium reading device 1006 records the input program. The CPU 1001 stores the read program in the HDD 1005, the ROM 1002, or the RAM 1003.

The CPU 1001 is a central processing unit that is responsible for operational control of the whole input device 10. When the CPU 1001 executes the input program so as to read out the input program from the HDD 1005, the CPU 1001 functions as the obtaining unit 11, the detection unit 12, the calculation unit 13, the estimation unit 14, the selection unit 15, the display control unit 16, and the output unit 17 that are illustrated in FIG. 2. The input program may be stored in the ROM 1002 or the RAM 1003 that is allowed to access the CPU 1001.

When the obtaining unit 11 obtains an image from the imaging device 21 through a network, a communication device 1004 functions as the obtaining unit 11. That is, the computer 1000 may further include the communication device 1004. When the input device 10 communicates with the display device 22 through a network, the communication device 1004 functions as the output unit 17.

Furthermore, the HDD 1005 functions as the storage unit 18 illustrated in FIG. 2, under the control of the CPU 1001. That is, the HDD 1005 stores setting information. Similar to the program, the setting information may be stored in the ROM 1002 or the RAM 1003 that is allowed to access the CPU 1001.

In addition, information that is generated in the course of the processing of FIGS. 7A and 7B is temporarily stored in the RAM 1003 that functions as the storage unit 18. That is, data of the storage unit 18 is stored in a storage device such as the HDD 1005, the ROM 1002, or the RAM 1003.

When the input device 10 includes the communication device 1004, a signal is received from another device through a network, and the contents of the signal are transmitted to the CPU 1001. In addition, the communication device 1004 transmits a signal to another device through a network in response to an instruction from the CPU 1001.

The input device 10 or the information processing device 1 may include the imaging device 21 or the display device 22. The imaging device 21 captures an image at a certain frame interval, performs conversion into a digital signal, and outputs the captured image data to the CPU 1001. The imaging device 21 includes, for example, a charge coupled device (CCD) sensor or a complementary metal oxide semiconductor (CMOS) sensor, and for example, captures an image of the hand of the user.

The display device 22 is, for example, a projector or a display. The display device 22 projects or displays the menu items that are selected on the basis of an angle of the finger by the user.

(Modification 1)

Here, an example of another system configuration that is different from that of illustrated in FIG. 1 is described. For example, a camera that is installed in a vehicle captures an image of the hand and the finger of the user. An operation area is an area the image of which is allowed to be captured from the camera, and may include, for example, the leg (thigh) area or the like of the user. In addition, a car navigation system obtains the image from the camera.

The car navigation system includes an input device and also functions as an information processing device. The car navigation system calculates an angle of the finger on the basis of the image that is obtained from the camera, selects a menu item, and executes the selected menu item. In addition, the selected menu item may be displayed on a display that is included in the car navigation system.

(Modification 2)

Furthermore, the input device 10 may fix the provisional input item as a fixed input item when the first and second angles are substantially the same. The first angle is calculated by the first image and the second angle is calculated by the second image captured after the first image. So the second image including the hand and the finger is obtained. And the second angle is calculated based on the position of the fingertip with respect to the plane in which the pressing operation is performed. The provisional input item is fixed as a fixed input item when the first angle and second angle are substantially the same. On the other hand, a new provisional input item is selected when the second angle is not substantially the same as the first angle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input method that is executed by a computer, the input method comprising:

obtaining a first image of an object using an imaging device;

detecting a first area of the object from the first image, identifying a first feature point of the object based on a shape of the first area, the first feature point corresponding to a part of the object which touches a plane where a pressing operation is performed;

calculating a first angle of the object with respect to the plane based on the first feature point and the first area;

selecting a first input item from a plurality of input items based on the first angle;

obtaining a second image including the object, the second image being captured by the imaging device which captured the first image after the first image is captured;

detecting a second area of the object from the second image;

when a second feature point is not identified from the second image, calculating a second angle of the object in the second image based on the second area and the first feature point, the second feature point corresponding to the part of the object which touches the plane;

when the second feature point is identified from the second image, calculating the second angle of the object in the second image based on the second area and the second feature point; and selecting a second input item from the plurality of input items, based on the second angle.

2. The input method according to claim 1, further comprising:

determining whether the pressing operation is being continued when the second feature point is not identified from the second image; and inputting the first input item to a device when the pressing operation is not being continued.

3. The input method according to claim 2, wherein the determining whether the pressing operation is being continued is performed based on a positional relationship between the first feature point and the second area.

4. The input method according to claim 1, wherein the first feature point represents a first distal portion of the object, and the pressing operation is conducted on fulcrum corresponding to first feature point.

5. The input method according to claim 4, wherein the object is at least one of a hand and a finger, the first distal portion is a fingertip.

6. An input device comprising:

a memory; and a processor coupled to the memory and configured to:

obtain a first image of an object using an imaging device, detect a first area of the object from the first image, identify a first feature point of the object based on a shape of the first area, the first feature point corresponding to a part of the object which touches a plane where a pressing operation is performed, calculate a first angle of the first object with respect to the plane based on the first feature point and the first area, select a first input item from a plurality of input items based on the first angle, obtain a second image including the object, the second image being captured by the imaging device which captured the first image after the first image is captured, detect a second area of the object from the second image, when a second feature point is not identified from the second image, calculate a second angle of the object in the second image based on the second area and the first feature point, the second feature point corresponding to the part of the object which touches the plane, when the second feature point is identified from the second image, calculate the second angle of the object in the second image based on the second area and the second feature point, and select a second input item from the plurality of input items, based on the second angle.

7. The input device according to claim 6, wherein the input device is a part of an information processing device that receives the first input item.

8. The input device according to claim 7, wherein the information processing device is one of a smartphone, a tablet device and a personal computer.

9. The input device according to claim 6, wherein the input device is connected to at least one of a smartphone, a tablet device and a personal computer.

10. The input device according to claim 6, wherein the processor is further configured to:

determine whether the pressing operation is being continued when the second feature point is not identified from the second image, and input the first input item to a device when the pressing operation is not being continued.

11. The input device according to claim 10, wherein the determining whether the pressing operation is being continued is performed based on a positional relationship between the first feature point and the second area.

12. The input device according to claim 6, wherein the first feature point represents a first distal portion of the object, and the pressing operation is conducted on fulcrum corresponding to first feature point.

13. The input device according to claim 12, wherein the object is at least one of a hand and a finger, the first distal portion is a fingertip.

14. An input method that is executed by a computer, the input method comprising:

obtaining a first image including a hand with a finger, the first image being captured by an image capturing device;

detecting a first hand area from the first image;

identifying a first fingertip point of the finger when a pressing operation using the fingertip is detected;

calculating a first angle of the finger with respect to a plane where the pressing operation is performed, based on the first hand area detected from the first image and the first fingertip point;

selecting a first input command from a plurality of input commands according to the first angle;

obtaining a second image including the hand, the second image being captured by the imaging device which captured the first image after the first image is captured;

detecting a second hand area from the second image;

when a second fingertip point is not identified from the second image, calculating a second angle of the finger in the second image based on the second hand area and the first fingertip point;

when the second fingertip point is identified from the second image, calculating the second angle of the finger in the second image based on the second hand area and the second fingertip point; and selecting a second input item from the plurality of input items, based on the second angle.

* * * * *